United States Patent
Propheter-Hinckley et al.

(10) Patent No.: US 8,100,633 B2
(45) Date of Patent: Jan. 24, 2012

(54) COOLING AIR MANIFOLD SPLASH PLATES AND GAS TURBINES ENGINE SYSTEMS INVOLVING SUCH SPLASH PLATES

(75) Inventors: Tracy A. Propheter-Hinckley, Manchester, CT (US); Charles C. Wu, Glastonbury, CT (US)

(73) Assignee: United Technologies Corp., Hartford, CT (US)

( * ) Notice: Subject to any disclaimer, the term of this patent is extended or adjusted under 35 U.S.C. 154(b) by 988 days.

(21) Appl. No.: 12/045,781

(22) Filed: Mar. 11, 2008

(65) Prior Publication Data

US 2009/0232637 A1   Sep. 17, 2009

(51) Int. Cl.
*F04D 29/00* (2006.01)
*F04D 29/54* (2006.01)

(52) U.S. Cl. ............ 415/115; 415/176; 415/208.1

(58) Field of Classification Search ............ 415/108, 415/115, 116, 175, 176, 208.1, 232
See application file for complete search history.

(56) References Cited

U.S. PATENT DOCUMENTS

| | | | |
|---|---|---|---|
| 5,165,847 A * | 11/1992 | Proctor et al. | 415/115 |
| 5,538,393 A | 7/1996 | Thompson et al. | |
| 5,964,575 A * | 10/1999 | Marey | 415/115 |
| 6,241,467 B1 | 6/2001 | Zelesky et al. | |
| 6,325,595 B1 | 12/2001 | Breeze-Stringfellow et al. | |
| 6,550,254 B2 | 4/2003 | Proctor et al. | |
| 6,585,482 B1 | 7/2003 | Liotta et al. | |
| 6,735,956 B2 | 5/2004 | Romani | |
| 6,761,529 B2 | 7/2004 | Soechting et al. | |
| 6,783,324 B2 | 8/2004 | Muny | |
| 6,929,445 B2 * | 8/2005 | Zatorski et al. | 415/115 |
| 7,033,138 B2 * | 4/2006 | Tomita et al. | 415/139 |
| 7,090,461 B2 | 8/2006 | Liang | |
| 7,108,479 B2 * | 9/2006 | Beverley et al. | 415/115 |
| 7,192,245 B2 | 3/2007 | Djeridane et al. | |
| 7,670,108 B2 * | 3/2010 | Liang | 415/173.1 |

* cited by examiner

*Primary Examiner* — Edward Look
*Assistant Examiner* — Liam McDowell

(57) ABSTRACT

Cooling air manifold splash plates and gas turbine engine systems involving such splash plates are provided. In this regard, a representative cooling air manifold splash plates includes: a base having an aperture; and an air deflector supported by the base, the air deflector being positioned relative to the base to receive, from the aperture, a radial flow of gas turbine engine cooling air, the air deflector being operative to redirect at least some of the air received circumferentially.

22 Claims, 5 Drawing Sheets

COOLING AIR MANIFOLD SPLASH PLATES AND GAS TURBINES ENGINE SYSTEMS INVOLVING SUCH SPLASH PLATES

STATEMENT REGARDING FEDERALLY SPONSORED RESEARCH AND DEVELOPMENT

The U.S. Government may have an interest in the subject matter of this disclosure as provided for by the terms of contract number N00019-02-C-3003 awarded by the United States Air Force.

BACKGROUND

1. Technical Field

The disclosure generally relates to gas turbine engines.

2. Description of the Related Art

Turbine vanes of some gas turbine engines are cooled by air that is routed toward the vanes by conduit. The conduit transports the cooling air along a path that is radially outboard of the vanes. Cooling air from the conduit is provided to an annular manifold that distributes the air among the vanes.

SUMMARY

Cooling air manifold splash plates and gas turbine engine systems involving such splash plates are provided. In this regard, an exemplary embodiment of a cooling air manifold splash plate for a gas turbine engine comprises: a base having an aperture; and an air deflector supported by the base, the air deflector being positioned relative to the base to receive, from the aperture, a radial flow of gas turbine engine cooling air, the air deflector being operative to redirect at least some of the air received circumferentially.

An exemplary embodiment of an assembly for a gas turbine engine comprises: a cooling air conduit having an opening, the cooling air conduit being operative to deliver a flow of cooling air through the opening; and a splash plate having an air deflector positioned outside the opening and in a flow path of the flow of cooling air, the air deflector being operative to redirect at least some of the cooling air circumferentially.

An exemplary embodiment of a gas turbine engine comprises: a compressor; a turbine operative to drive the compressor, the turbine having stationary vanes; and a cooling air assembly operative to provide cooling air to the vanes, the cooling air assembly having a cooling air conduit and a splash plate, the cooling air conduit having an opening and being operative to deliver a flow of cooling air through the opening, the splash plate having an air deflector positioned outside the opening and in a flow path of the flow of cooling air, the air deflector being operative to redirect at least some of the cooling air circumferentially such that the cooling air is available for delivery to the vanes.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Cooling air manifold splash plates and gas turbine engine systems involving such splash plates are provided, several exemplary embodiments of which will be described in detail. In some embodiments, such a splash plate is used to direct air from a cooling air conduit so that the cooling air spreads circumferentially within a manifold that is used to provide the cooling air to cooling passages of turbine vanes. Notably, air provided from a cooling air conduit may have a tendency to provide more cooling air flow to vanes located in a vicinity of an opening of the cooling air conduit than to vanes displaced from the opening unless such a splash plate is used.

Figure 1:
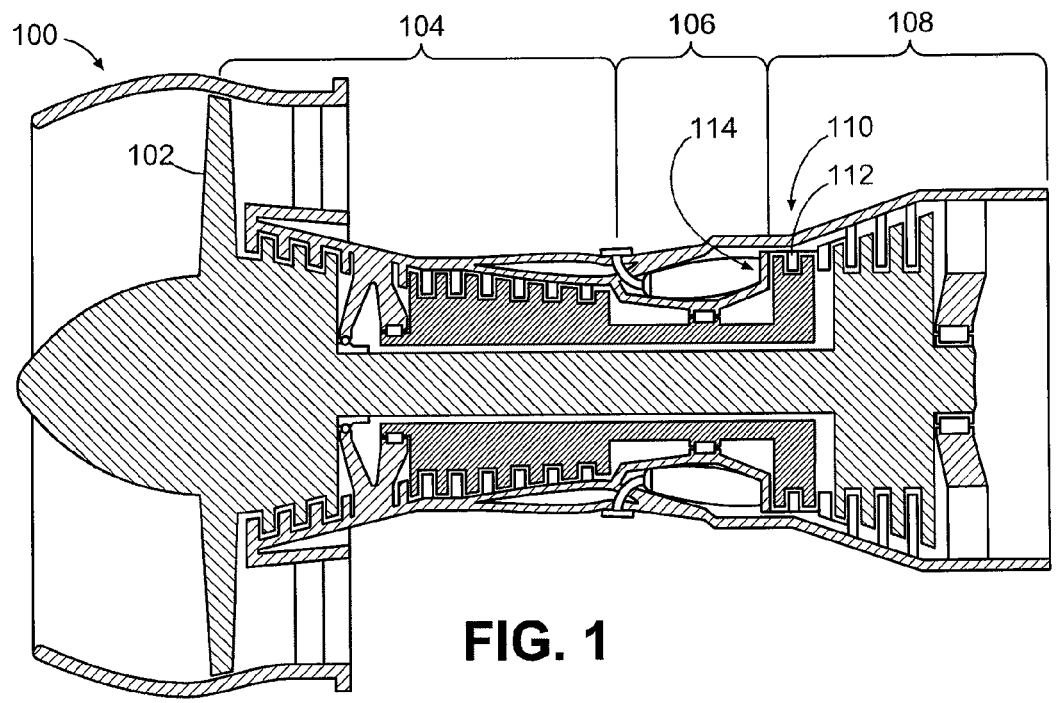
FIG. 1 is a schematic diagram depicting an exemplary embodiment of a gas turbine engine.

In this regard, reference is made to the schematic diagram of FIG. 1, which depicts an exemplary embodiment of a gas turbine engine. As shown in FIG. 1, engine 100 is depicted as a turbofan that incorporates a fan 102, a compressor section 104, a combustion section 106 and a turbine section 108. Also shown is a cooling air assembly 110 that provides cooling air for several turbine vanes. Specifically, cooling air assembly 110 provides cooling air for cooling the second stage vanes (e.g., vane 112) of high pressure turbine 114. Notably, although depicted as a turbofan gas turbine engine, it should be understood that the concepts described herein are not limited to use with turbofans as the teachings may be applied to other types of engines, such as steam turbine engines and other configurations of gas turbine engines, e.g., industrial gas turbine engines. Further, the concepts are not limited to use with second stage vanes.

Figure 2:
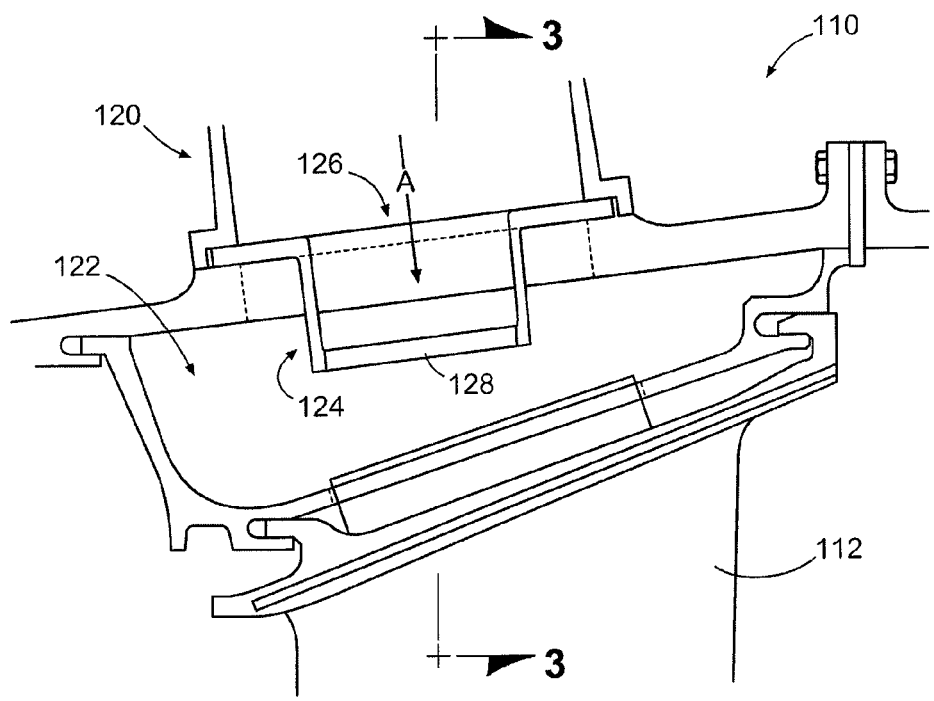
FIG. 2 is a schematic diagram depicting a portion of a vane assembly of the embodiment of FIG. 1.
Figure 3:
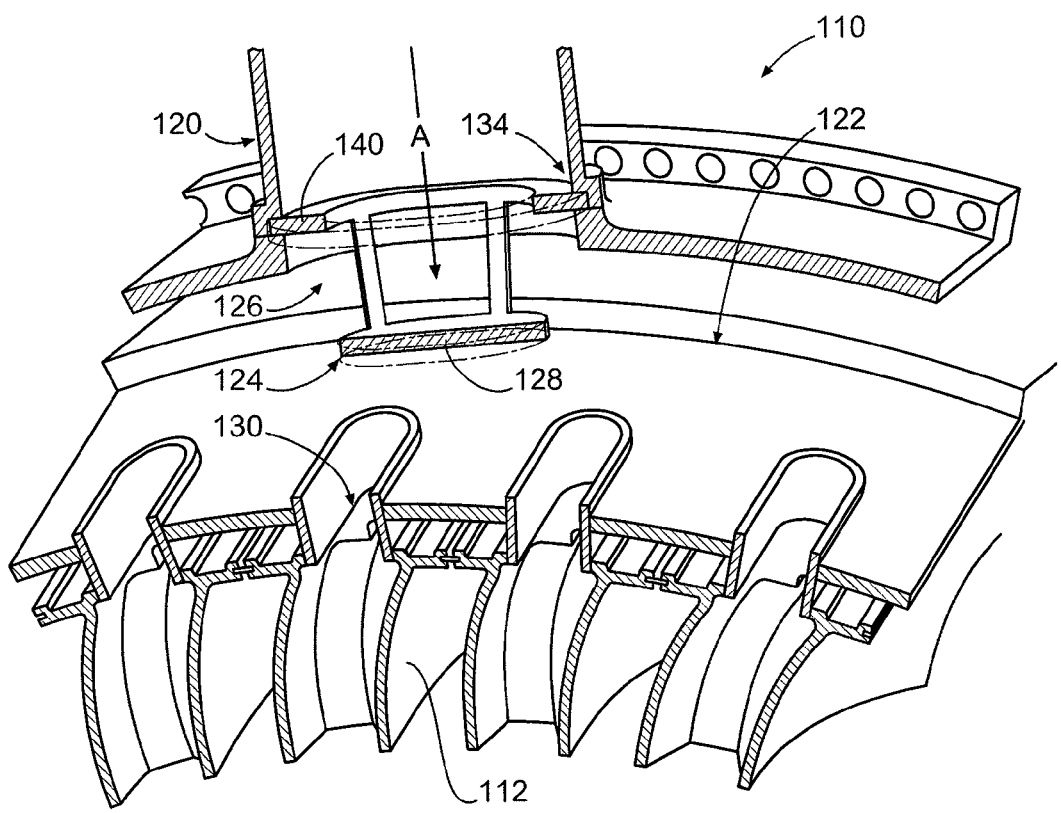
FIG. 3 is a cross-sectional diagram as viewed along section line 3-3 of FIG. 2.

As shown in FIGS. 2 and 3, cooling air assembly 110 incorporates a cooling air conduit 120, a manifold 122 and a splash plate 124. The cooling air conduit 120 includes an opening 126 through which cooling air is delivered to the manifold 122. Splash plate 124 includes an air deflector 128 that is positioned in a vicinity of opening 126. Specifically, in this embodiment, air deflector 128 is positioned outside of opening 126 and in a flow path of the flow of cooling air (depicted by arrow A). This configuration enables the air deflector to redirect at least some of the cooling air so that the cooling air is distributed circumferentially within manifold 122 and provided to the cooling passages (e.g., passage 130) of the vanes. Splash plate 124 is mounted adjacent to opening 126 of the cooling air conduit by an interference fit formed between a base 140 of the splash plate and portions of manifold 122 and conduit 120 that define a recess 134.

Figure 4:
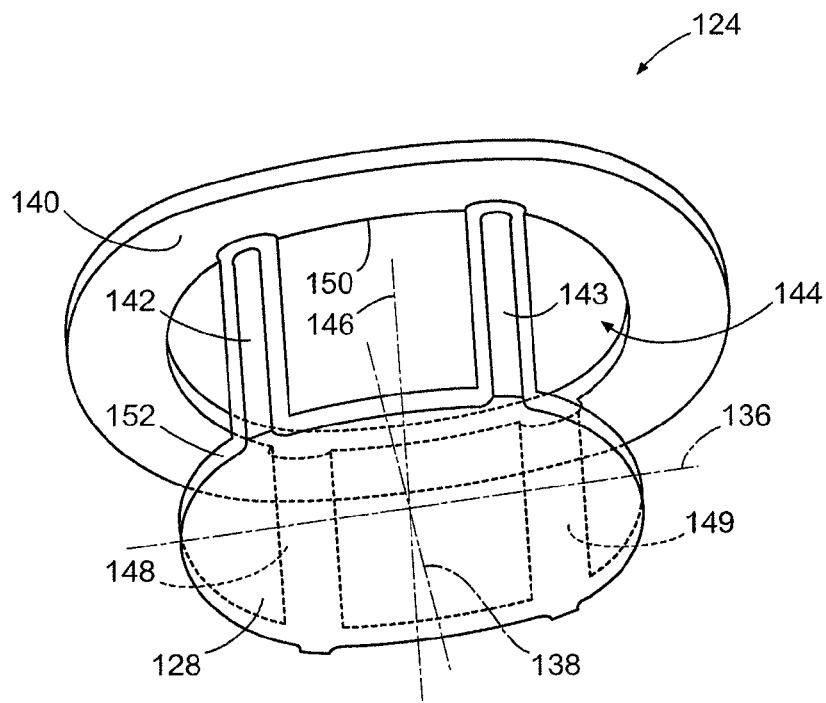
FIG. 4 is a schematic diagram depicting the splash plate of FIGS. 1-3.

Splash plate 124 is shown in greater detail in FIG. 4, in which it is shown that splash plate 124 includes air deflector 128, base 140 and struts (e.g., strut 142) extending between the base and the air deflector. Air deflector 128 is generally planar and exhibits a major axis 136 that is perpendicular to a longitudinal axis of the engine, and a minor axis 138 that is parallel to the longitudinal axis.

Base 140 supports air deflector 128 and includes an aperture 144. Air deflector 128 is spaced from the base and generally extends across a centerline 146 of aperture 144. In this embodiment, the air deflector is positioned relative to the base to receive an inwardly directed, radial flow of cooling air that passes through aperture 144. The air deflector then redirects at least some of the air circumferentially, with at least some of the redirected air flowing across the exterior surfaces of the struts.

In splash plate 124, two pairs of struts (i.e., struts 142, 143 and struts 148, 149) are used. Each of the struts is generally rectangular in shape and extends between an edge 150 of the aperture 144 and an outer periphery 152 of air deflector 128. The struts establish the spacing between the base and the air deflector and, as such, the dimensions of and separation between the struts influence the flow characteristics of the cooling air entering the manifold 122 via the splash plate 124. Notably, in other embodiments, various other numbers, shapes and/or configurations of struts can be used.

Figure 5:
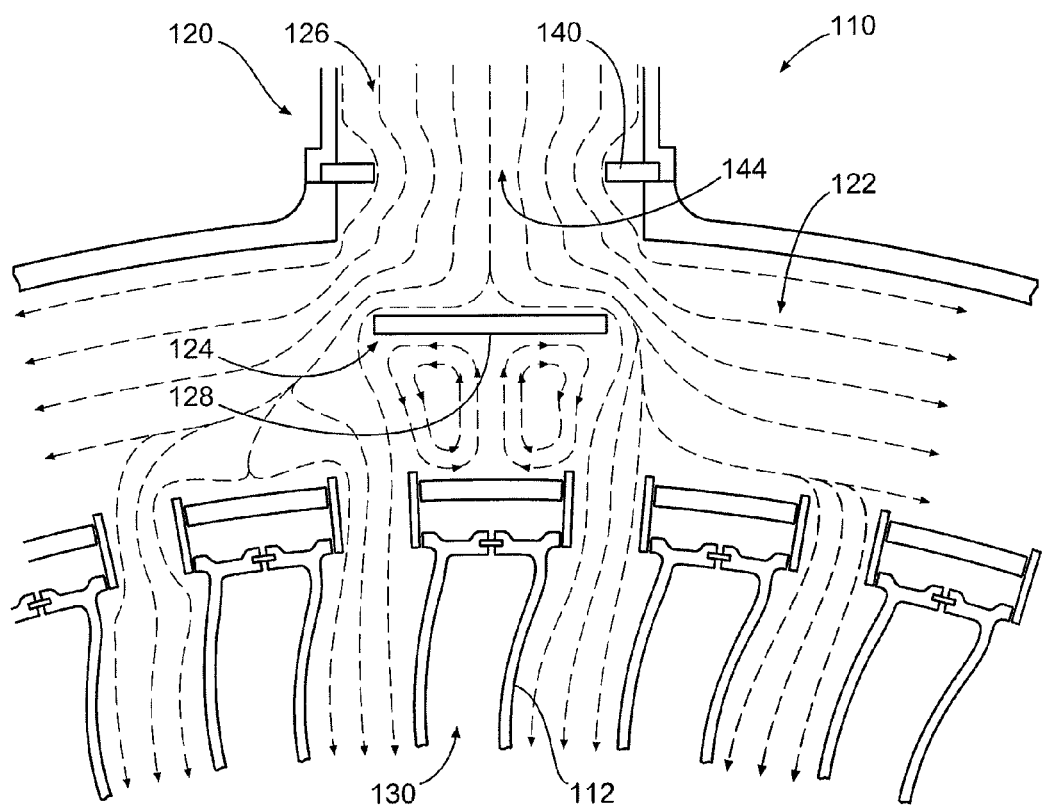
FIG. 5 is a schematic diagram depicting cooling air flowing relative to the embodiment of FIGS. 1-4.

As shown in FIG. 5, cooling air flowing through conduit 120 is expelled from opening 126 so that the cooling air enters manifold 122 after passing splash plate 124. As indicated by the arrows, the flow path of the cooling air (which is primarily directed radially inwardly in this embodiment) is redirected in response to encountering the air deflector 128. In particular, the air deflector causes at least some of the cooling air to spread circumferentially within the manifold at a distance that is spaced from the cooling passages (e.g., passage 130) of the turbine vanes (e.g., vane 112). This enables the cooling air to spread more evenly within the manifold and into the vanes than may otherwise occur if the splash plate were not present.

Figure 6:
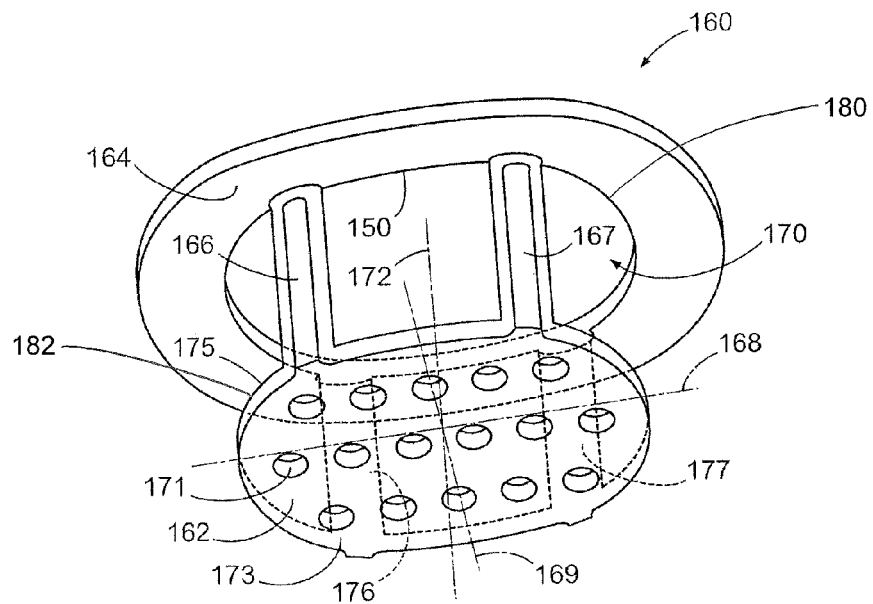
FIG. 6 is a schematic diagram depicting another exemplary embodiment of a splash plate.

FIG. 6 is a schematic diagram depicting another exemplary embodiment of a splash plate. As shown in FIG. 6, splash plate 160 includes an air deflector 162, a base 164 and struts (e.g., strut 166) extending between the base and the air deflector. Air deflector 162 is generally planar and exhibits a major axis 168 that is typically oriented perpendicular to a longitudinal axis of the engine in which the splash plate is installed, and a minor axis 169 that is parallel to the longitudinal axis. Additionally, the air deflector includes holes (e.g., hole 171) that extend between surfaces 173, 175 of the air deflector. At least some of the holes through the air deflector allow air to be directed to the vanes via line of sight flow paths in contrast to being redirected around the air deflector.

Base 164 supports air deflector 162 and includes an aperture 170. Air deflector 162 is spaced from the base and generally extends across a centerline 172 of aperture 170. In this embodiment, the air deflector is positioned relative to the base to receive a flow of cooling air that passes through aperture 170. The air deflector then redirects at least some of the air for distribution through an associated manifold, with at least some of the redirected air flowing across the exterior surfaces of the struts.

In splash plate 160, two pairs of struts (i.e., struts 166, 167 and struts 176, 177) are used. Each of the struts is generally rectangular in shape and extends from an edge 180 of the aperture 170 to an outer periphery 182 of air deflector 162.

Figure 7:
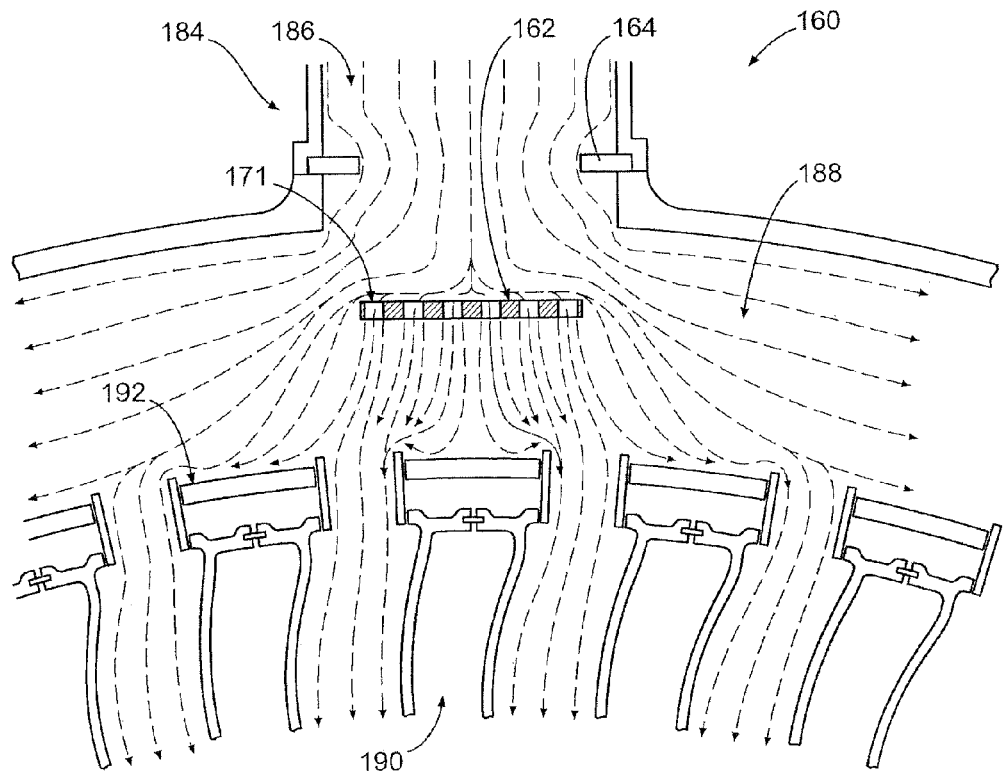
FIG. 7 is a schematic diagram depicting cooling air flowing relative to the embodiment of FIG. 6.

As shown in FIG. 7, cooling air (depicted by arrows) flowing through a cooling air conduit 184 is expelled from an opening 186 of the conduit so that the cooling air enters a manifold 188 after passing splash plate 160. The flow path of the cooling air is redirected in response to encountering the air deflector 162. In particular, the air deflector causes at least some of the cooling air to spread circumferentially within the manifold prior to entering cooling passages (e.g., passage 190) of the turbine vanes (e.g., vane 192).

Figure 8:
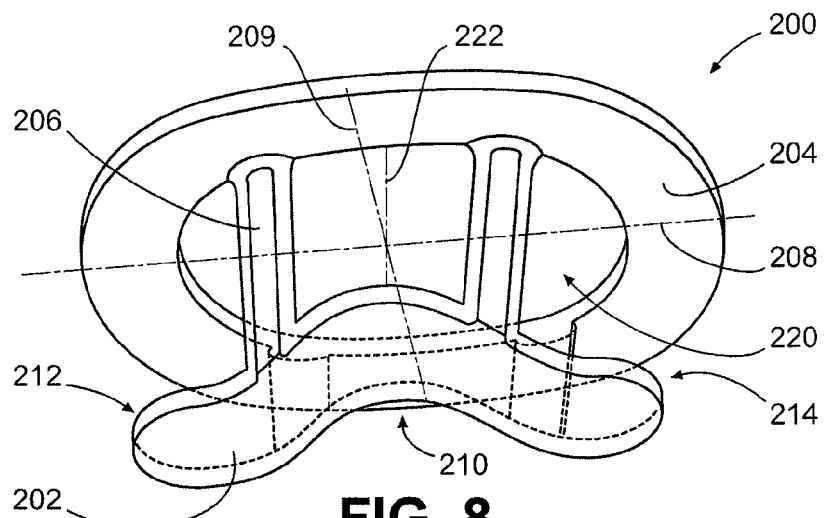
FIGS. 8-10 are schematic diagrams depicting other exemplary splash plate embodiments.

FIG. 8 is a schematic diagram depicting another exemplary embodiment of a splash plate. As shown in FIG. 8, splash plate 200 includes an air deflector 202, a base 204 and struts (e.g., strut 206) extending between the base and the air deflector. Air deflector 202 exhibits a major axis 208 that is typically oriented perpendicular to a longitudinal axis of the engine in which the splash plate is installed, and a minor axis 209 that is parallel to the longitudinal axis. Air deflector 202 also includes an intermediate portion 210 that is located between end portions 212, 214. In this embodiment, the intermediate portion exhibits a concave curve toward base 204, with the end portions exhibiting convex curves that assist in redirecting the air impinging upon the air deflector.

Base 204 supports air deflector 202 and includes an aperture 220. Air deflector 202 is spaced from the base and generally extends across a centerline 222 of aperture 220. In this embodiment, the air deflector is positioned relative to the base to receive a flow of cooling air that passes through aperture 220. The air deflector then redirects at least some of the air for distribution through an associated manifold, with at least some of the redirected air flowing across the exterior surfaces of the struts. Notably, the curvature exhibited by the air deflector tends to encourage air flow in a circumferential direction (i.e., toward the ends of the air deflector).

Figure 9:
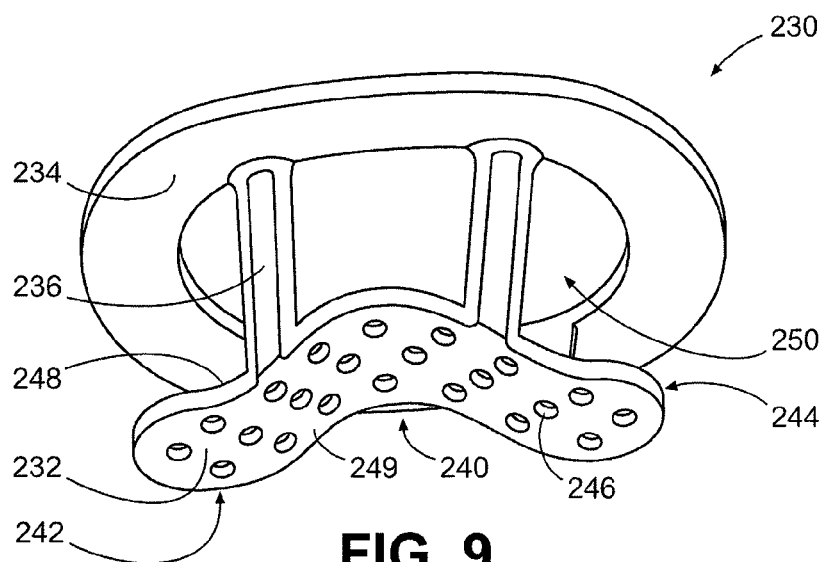

FIG. 9 is a schematic diagram depicting another exemplary embodiment of a splash plate. As shown in FIG. 9, splash plate 230 includes an air deflector 232, a base 234 and struts (e.g., strut 236) extending between the base and the air deflector. Air deflector 232 includes an intermediate portion 240 that is located between end portions 242, 244. In this embodiment, the intermediate portion exhibits a concave curve toward base 204, with the end portions exhibiting convex curves. Unlike the embodiment of FIG. 8, splash plate 230 includes holes (e.g., hole 246) in the air deflector that extend from side 248 to side 249.

Base 234 supports air deflector 232 and includes an aperture 250. Air deflector 232 is positioned relative to the base to receive a flow of cooling air that passes through aperture 250. The air deflector then redirects at least some of the air for distribution through an associated manifold, with at least some of the redirected air flowing across the exterior surfaces of the struts. Notably, the curvature exhibited by the air deflector tends to encourage air flow in a circumferential direction (i.e., toward the ends of the air deflector).

Figure 10:
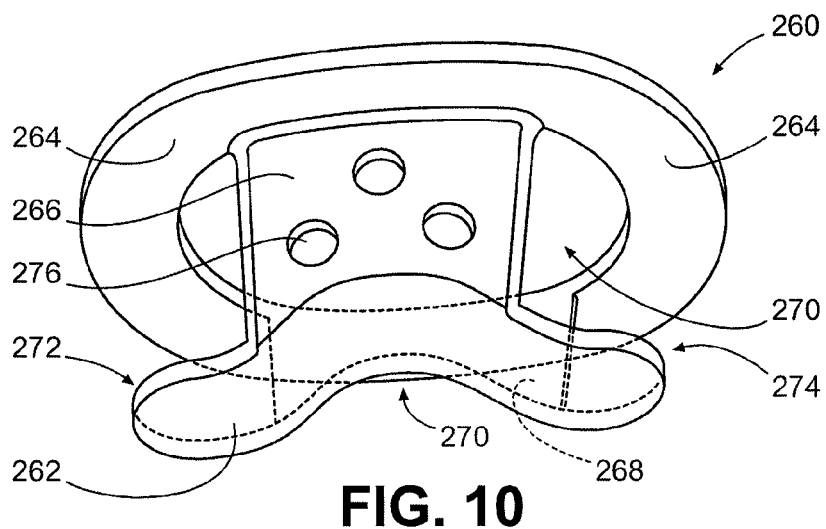

FIG. 10 is a schematic diagram depicting another exemplary embodiment of a splash plate. As shown in FIG. 10, splash plate 260 includes an air deflector 262, a base 264 and a pair of struts 266, 268 that extend between the base and the air deflector. Air deflector 262 includes an intermediate portion 270 that is located between end portions 272, 274. In this embodiment, the intermediate portion exhibits a concave curve toward base 264, with the end portions exhibiting convex curves.

Base 264 supports air deflector 262 and includes an aperture 270. Air deflector 262 is positioned relative to the base by struts 266, 268 to receive a flow of cooling air that passes through aperture 270. The air deflector then redirects at least some of the air for distribution through an associated manifold, with at least some of the redirected air flowing across the exterior surfaces of the struts. Notably, at least the trailing strut 266 (which is located downstream of strut 268 relative to the core flow of the engine in which the splash plate is mounted) includes holes (e.g., holes 276) through which redirected cooling air also can flow. Such holes can encourage downstream flow of the cooling air within the manifold. In other embodiments, neither, either or both of the struts can incorporate holes.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A cooling air manifold splash plate for a gas turbine engine comprising:
   a base having an aperture;
   an air deflector supported by the base, the air deflector being positioned relative to the base to receive, from the aperture, a radial flow of gas turbine engine cooling air, the air deflector including an air deflector surface operative to redirect at least some of the air received circumferentially; and
   a plurality of struts extending between the base and the air deflector, and defining a plurality of airflow apertures, each of which is respectively located between adjacent struts, wherein each airflow aperture extends from the air deflector surface to the aperture in the base.

2. The splash plate of claim 1, wherein the air deflector is operative to direct at least some of the air provided through the aperture outwardly across an exterior surface of each strut.

3. The splash plate of claim 2, wherein:
   each strut has a hole formed therethrough; and
   the air deflector is operative to direct at least some of the air provided through the aperture outwardly through the hole of each strut.

4. The splash plate of claim 1, wherein the air deflector has a first side facing the aperture, a second side facing away from the aperture, and a hole extending between the first side and the second side.

5. The splash plate of claim 4, wherein the hole is a first hole of multiple holes extending through the air deflector.

6. The splash plate of claim 1, wherein the air deflector exhibits a curve configured to redirect the at least some of the air received circumferentially.

7. The splash plate of claim 6, wherein:
   the air deflector has a first end portion, a second end portion and an intermediate portion located between the first end portion and the second end portion; and
   the intermediate portion exhibits a convex curve relative to a flow direction from the aperture to the air deflector.

8. The splash plate of claim 7, wherein the intermediate portion is aligned with a centerline of the aperture.

9. The splash plate of claim 7, wherein each of the first end portion and the second end portion exhibits a concave curve relative to the flow direction.

10. The splash plate of claim 9, wherein each of the first end portion and the second end portion is operative to direct at least some of the air circumferentially through at least some of the airflow apertures.

11. The splash plate of claim 1, wherein the air deflector is planar.

12. The splash plate of claim 1, wherein the air deflector surface has a circumferentially extending width and an axially extending length that is less than the circumferentially extending width.

13. An assembly for a gas turbine engine comprising:
   a cooling air conduit having an opening, the cooling air conduit being operative to deliver a flow of cooling air through the opening; and
   a splash plate having an air deflector and a plurality of struts, the air deflector being positioned outside the opening and in a flow path of the flow of cooling air, the air deflector including an air deflector surface operative to redirect at least some of the cooling air circumferentially, the struts extending from the air deflector towards the opening and defining a plurality of airflow apertures, each of which is respectively located between adjacent struts, wherein each airflow aperture extends from the air deflector surface to the opening.

14. The assembly of claim 13, wherein:
   the splash plate has a base operative to support the air deflector, the base having an aperture formed therethrough;
   the base is mounted adjacent to the opening of the cooling air conduit; and
   the air deflector is positioned relative to the opening to receive a radial flow of gas turbine engine cooling air passing through the aperture.

15. The assembly of claim 13, wherein:
   the air deflector has a first end portion, a second end portion and an intermediate portion located between the first end portion and the second end portion;
   the intermediate portion is aligned with a centerline of the aperture; and
   the intermediate portion exhibits a convex curve relative to a flow direction from the aperture to the air deflector.

16. The assembly of claim 13, wherein the air deflector is operative to direct at least some of the air provided through the aperture outwardly across an exterior surface of each strut.

17. The assembly of claim 13, further comprising a cooling air manifold operative to receive cooling air provided by the cooling air conduit and distribute the cooling air to multiple turbine vanes.

18. The assembly of claim 17, wherein
   the assembly further comprises the multiple turbine vanes; and
   the manifold pneumatically communicates with corresponding cooling passages of the multiple turbine vanes.

19. A gas turbine engine comprising:
   a compressor;
   a turbine operative to drive the compressor, the turbine having stationary vanes; and
   a cooling air assembly operative to provide cooling air to the vanes, the cooling air assembly having a cooling air conduit and a splash plate, the cooling air conduit having an opening and being operative to deliver a flow of cooling air through the opening, the splash plate having an air deflector and a plurality of struts, the air deflector being positioned outside the opening and in a flow path of the flow of cooling air, the air deflector including an air deflector surface operative to redirect at least some of the cooling air circumferentially such that the cooling air is available for delivery to the vanes, the struts extending from the air deflector towards the opening and defining a plurality of airflow apertures, each of which is respectively located between adjacent struts, wherein each airflow aperture extends from the air deflector surface to the opening.

20. The engine of claim 19, wherein the vanes are second stage turbine vanes.

21. The engine of claim 19, wherein the turbine is a high pressure turbine.

22. The engine of claim 19, wherein the engine is a turbofan.

* * * * *